United States Patent

[11] 3,607,343

[72] Inventors  Frank N. Longo
                Ellwood, Huntington;
                Ferdinand J. Dittrich, Bellmore, both
                of N.Y.
[21] Appl. No. 611,246
[22] Filed Jan. 24, 1967
[45] Patented Sept. 21, 1971
[73] Assignee Metco Inc.
                Westbury, N.Y.
                Continuation-in-part of application Ser. No.
                492,887, Oct. 4, 1965, now abandoned.

[54] FLAME SPRAY POWDERS AND PROCESS WITH ALUMINA HAVING TITANIUM DIOXIDE BONDED TO THE SURFACE THEREOF
8 Claims, No Drawings

[52] U.S. Cl. .................................................... 117/27,
        106/65, 117/33, 117/46, 117/100, 117/105.2
[51] Int. Cl. ........................................................ B44d 1/097,
        C04b 35/10
[50] Field of Search ........................................... 117/27, 46
        FS, 100 I, 105, 105.2, 33; 106/65

[56] References Cited
UNITED STATES PATENTS

| | | | |
|---|---|---|---|
| 2,842,447 | 7/1958 | Schlotzhauer ............... | 106/57 |
| 2,904,449 | 9/1959 | Bradstreet ................... | 117/46 FS |
| 3,069,292 | 12/1962 | Alexander ................... | 117/100 I |
| 3,254,970 | 6/1966 | Dittrich et al ................ | 117/105.2 |
| 3,322,515 | 5/1967 | Dittrich et al ................ | 117/105.2 |

FOREIGN PATENTS

| | | | |
|---|---|---|---|
| 683,089 | 3/1964 | Canada ....................... | 117/46 FS |

OTHER REFERENCES

"Powders for Flame Spraying," Metco, Research-Development, received Scientific Library - U.S. Patent Office July 23, 1963, pp. (1), (2), and (3).

*Primary Examiner*—William D. Martin
*Assistant Examiner*—Raymond M. Speer
*Attorney*—Burgess, Dinklage & Sprung ABSTRACT: A flame spray process and a powder composition for use therein consisting of alumina particles having 1 to 50 percent by volume of titanium dioxide bonded to the surface thereof in which said alumina particles have a particle size between about +5 microns and −100 mesh and in which said titanium dioxide is in the form of particles having a particle size of −10 microns bonded to the alumina particles with a bonding agent which is substantially decomposed or volatilized during the flame spray process.

FLAME SPRAY POWDERS AND PROCESS WITH ALUMINA HAVING TITANIUM DIOXIDE BONDED TO THE SURFACE THEREOF

This is a continuation-in-part of our copending application Ser. No. 492,887, filed Oct. 4, 1965, and now abandoned.

This invention relates to an improved flame spray powder and flame spray process.

Flame spraying is a well known and commercially practiced process which involves the coating of a substrate by heat-softening or melting a coating material and spraying the same onto the substrate to be coated. The coating materials are generally in the form of a metal, ceramic, or a mixture thereof.

The flame spray coating as formed is generally porous, and for certain applications this porosity may be undesirable. Thus, when the coatings are intended to protect the substrate material from corrosion, oxidative or chemical attack, or intended to be utilized as electrical insulators, the inherent porosity is generally undesirable and it is often necessary to seal the sprayed coatings when, for example, the same are intended for these purposes. Flame sprayed coatings of ceramic, such as refractory oxides or ceramic-metals, often do not have the desired resistance to wear or abrasion because of the inherent porosity and poor particle bond.

One object of this invention is a flame spray powder which allows the production of nonporous, wear-resistant flame spray coatings. This and still further objects will become apparent from the following description:

In accordance with the invention we have discovered that a nonporous flame spray coating that provides abrasion and wear-resistant characteristics and protects base materials against corrosive environments, is formed if the flame spray process is effected utilizing a flame spray powder, the individual particles of which have a fluxing ceramic bonded to the surface thereof. The spraying may be effected in the conventional manner with any powder-type flame spray equipment, as for example, the powder-type gun described in U.S. Pat. No. 2,961,335, or a plasma-type flame spray powder gun as described in U.S. Pat. Nos. 3,145,287 and 2,960,594.

The flame spray powder may comprise particles of any conventional or known flame spray material, as for example metals or alloys, such as stainless steels, carbon steels, iron, nickel-chromium alloys, nickel-copper alloys, chromium, nickel, cobalt, nickel clad aluminum, tungsten, molybdenum, tantalum, columbium, refractory metal alloys, platinum, silver, hafnium, silicon, titanium zirconium (and hydrides of these latter two), "self-fluxing alloys," aluminum, copper, brass, bronze, beryllium, vanadium; ceramics such as zirconia, titania, magnesia, ceria, rare earth oxides, hafnia, nickel oxide, thoria, beryllia, and preferably alumina, stabilized zirconia, and chromia; combinations of oxides including: alumina containing titania, zirconium silicate, magnesium silicate, calcium zirconate, magnesia alumina spinel, barium titanate, yttrium zirconate, aluminum silicate, mullite; cermets, such as cobalt clad or bonded zirconia, nickel clad or bonded alumina; carbides such as zirconium carbide, tantalum carbide, hafnium carbide, columbium carbide, boron carbide, and preferably tungsten carbide, chromium carbide and titanium carbide; combined carbides including tantalum carbide with zirconium or hafnium carbide. Any of the above listed carbides may be crystalline, i.e. "pure" carbides or bonded carbides, as for example tungsten carbide bonded with 5-20 percent cobalt, titanium carbide bonded with 5-20 percent nickel, chromium carbide bonded with 5-20 percent nickel or nickel-chrome alloy. The carbides, such as any of the above carbides, may also be clad for example with nickel, cobalt or nickel-chrone alloy. The flame spray powder may also be a boride, such as a boride of zirconium, hafnium, titanium, silicon or chromium, or may be a silicide, such as a silicite of molybdenum or chromium, or a nitride, as for example a nitride of titanium. In addition, mixtures of particles as are conventionally used in the flame spray art may be utilized in accordance with the invention, such as mixtures of nickel clad aluminum or nickel-chromium-aluminum alloys mixed with zirconia or alumina; self-fluxing alloys mixed with cobalt bonded tungsten carbide, or nickel clad or bonded chromium carbide, or tungsten or molybdenum or nickel clad aluminum; nickel chromium alloys mixed with chromium carbide; tungsten mixed with zirconia, and the like.

While each of the particles in the powder should preferably contain a fluxing ceramic bonded to its surface, within the broader scope of the invention it is possible to spray a powder in which only a portion of the particles contain the fluxing ceramic bonded to the surface, as for example, a mixture of one type of particles containing a fluxing ceramic bonded to their surface, with another type of particles which do not contain the fluxing ceramic, such as the fluxing ceramic coated alumina, zirconia or chromia powder admixed with self-fluxing alloy powders, nickel chrome alloy powders, aluminum powders, carbide powders, zirconia powder, or alumina powder. In order to obtain the benefits in accordance with the invention, however, the fluxing ceramic should be present in amount of at least 1 percent, and preferably at least 5 percent by volume based on the total powder being sprayed. In connection with the individual particles the fluxing ceramic should be present in amount of 1 to 50 percent and preferably 5 to 25 percent by volume of the particle.

Fluxing ceramics are well known in the art and have the property of wetting other oxide ceramics or dissolving (getting) and/or being dissolved in other metal oxides. The term "fluxing" is used herein in its broadest sense and designates the ability to wet other oxides at elevated temperatures. In particular the fluxing ceramic must have the ability to wet the surface of the nucleus particle at the spraying temperature. Ceramics containing lithium oxide, for example, provide excellent fluxing properties. In accordance with the invention any of the known or conventional fluxing ceramics may be used, including the known glasses or other oxide ceramics, as well as the so-called glass fluxers, such as are included in the group of borosilicate glasses. These may include amorphous glasses or crystalline glasses, such as sodium tetraborate or sodium tetraborate hydrate (borax).

Examples of the various types of fluxing ceramics which may be used include lithium cobalite, lithium manganite, lithium zirconate, lithium silicate, soda lime glass, borosilicate glasses, alumino borosilicates, high silicas, lithium titanate, titanium dioxide, and lithium aluminate. It has been found highly preferable, however, to utilize fluxing ceramics formed from alkali metal oxides and other metal oxides, such as cobalt oxide or manganese oxide, as for example, lithium cobaltite, or lithium manganite.

The powders in accordance with the invention should have the conventional size limits for flame spray powder. These powders generally have a size between +5 microns and −100 mesh. The particular optimum size varies with respect to the particular type of powders. Thus, refractory oxide powders are generally finer than ordinary metal powders and are generally below −270 mesh, though larger powders are sometimes used for special application. The ordinary metal powders are generally somewhat larger, varying for example, between −170 and +325 mesh. The powders in accordance with the invention should have the conventional size range for the powder of the type of the core material.

The initial particles may be in the form of conventional flame spray particles of the material to which the fluxing ceramic is to be applied. The fluxing ceramics may be bonded to the surface of these particles in any conventional manner. Thus, for example, a fused coating of the fluxing ceramic may be applied to the particles.

It has been found highly preferable to apply the fluxing ceramic as smaller individual particles having a particle size between +0.1 micron and −34 microns, preferably +0.5 micron and −10 microns, bonded to the surface of the main particles with an adhesive or bonding agent, and preferably an adhesive or bonding agent which is effectively decomposed or volatilized during the flame spray process. Examples of bonding agents which may be used include chlorinated rubber, polyesters, or polyolefins such as polyethylene, vinyls, cellulose plastics, and preferably a catalyzed resin, such as a phenolic or epoxy resin.

In accordance with one preferred embodiment, a standard varnish and preferably a phenolic resin varnish, is formed with the particles of the fluxing ceramic dispersed therein, in the same manner as a pigment in a paint, which is then applied to the basic flame spray particles and allowed to dry. The application may be effected in any desired manner, as for example, by simply mixing the particles with this varnish containing the fluxing ceramic or spraying the varnish containing the fluxing ceramic onto the particles, or the like.

In accordance with another mode, the basic particles and the finer fluxing ceramic powder are simply mixed together in a thin body of the varnish or binder, which is allowed to dry by solvent evaporation during the mixing, the powder after drying then being screened. Quite surprisingly no appreciable agglomeration occurs and the fluxing ceramic particles are fairly uniformly distributed on the surface of the basic powder.

Special advantages are achieved in accordance with the invention, with the use of refractory oxide particles containing the fluxing ceramic particles bonded to their surface. The preferable refractory oxides are zirconia or chromia, and most preferably alumina containing 1 to 50 percent and preferably 5 to 25 percent by volume of a smaller particle size fluxing ceramic powder, such as titanium dioxide, lithium cobaltite or lithium manganite bonded to the particle surface, as for example with a phenolic resin. Flame spray coatings formed with the use of these powders have a substantial reduction in porosity as compared with coatings formed by spraying the refractory oxides per se, show high resistance to chemical, corrosive and oxidative attack, have improved dielectric properties and improved abrasion resistance and particle bond. The coatings are thus excellent protective coatings and may be considered "self-sealed," being smooth, tightly adherent, impermeable, and corrosion-resistant.

A preferred powder in accordance with the invention is alumina coated with titanium dioxide. A further preferred powder in accordance with the invention is magnesium oxide powder coated with titanium dioxide. These latter two powders may also be formed as aggregate powder granules containing the alumina or magnesium oxide or titanium dioxide. Thus aluminum oxide powders may be blended with the titanium dioxide powder, the mixture briquetted or bonded together with a bonding agent, or formed into an aggregate, as for example, after admixing with water and polyvinyl alcohol, and then crushed and screened to the desired particle size.

The flame spraying of the powders in accordance with the invention is effected in the conventional manner, using the conventional powder-type flame spray equipment. In certain instances the use of plasma-type flame spray guns has proven preferable. The coatings may be sprayed on any of the substrates conventionally sprayed, as for example, structural steels, carbon steels, alloy steels, nickel-base alloys, and aluminum.

The coatings may be used wherever it is desirable to protect the surface against wear or chemical attack. Thus, for example, aluminum oxide powders coated with a fluxing ceramic in accordance with the invention may be used on pump seals, pump shafts, plungers and seals, to protect against ear and chemical attack, and may also be used on the outside wet surface of engine cylinder liners to retard corrosion and erosion of the liner. Aluminum oxide or barium titanate, or other electrically insulating ceramic powders which are clad with fluxing ceramic in accordance with the invention, may be sprayed to provide coatings for electrical insulators, and show increased voltage breakdown strength. These may be used in voltage regulators, generators, relays, appliances, circuit breakers, capacitors, or supports. The cold refractory oxides may be used for high temperature applications to protect the substrate metals against oxidation and/or erosion. Coatings formed from these powders may be subjected to temperatures above the softening or melting point of the fluxing ceramic, and the fluxing ceramic will merely dissolve with the core oxide, forming solid solutions or compounds having melting points higher than the environmental temperature, so that the coatings will remain intact. Thus, for instance, coatings of these powders, such as formed from zirconia powder coated with the fluxing ceramic, may be used on rocket thrust chambers and nozzles, and for leading edges for aerospace vehicles. Coatings formed from clad alumina powder in accordance with the invention may be used on piston domes, and cylinder heads in internal combustion engines; and coatings formed from clad nickel-chromium alloy powders may be used on internal parts and housings of turbines to prevent erosion and oxidation, and may also be used to coat areas near engine exhaust exits, or in mufflers, or in the inside of stacks.

Coatings as thin as 0.002 inch and as thick as 0.030 inch may be formed, though in general coatings from 0.005 inch to 0.010 inch thickness are most common. It has been found preferable in connection with the spraying of ceramic materials, such as refractory oxides not to effect the spraying too hot as this may result in a lamination effect. In general, the spraying may be effected at coating substrate temperatures between 500° and 600° F., as measured with a surface contact pyrometer, with for example, spray distances between 6 and 7 inches.

The following examples are given by way of illustration and not of limitation:

EXAMPLE 1

A flame spray powder consisting of alumina particles containing 2.5 percent titanium oxide and having a particle size between −270 mesh and +15 microns, as sold under the trade name "METCO 101" was utilized as the basic flame spray particles. Lithium cobaltite powder of the size of −10 microns was utilized as the fluxing ceramic. The alumina flame spray powder (METCO 101) was thoroughly admixed with 6 percent by weight of a phenolic resin varnish, "METCOSEAL AP," which is an air drying phenolic containing 10 percent resin, dissolved in alcohol and aromatic hydrocarbons. Approximately 10 percent by volume of the fluxing ceramic, based on the total of the fluxing ceramic and alumina flame spray powder, was mixed with sufficient thinner ("METCOSEAL APT Thinner" which contains equal parts of hydrocarbon ketones and alcohol type solvents) to suspend the fluxing ceramic, about 60 percent by weight, based on the fluxing ceramic being required for this purpose. The fluxing ceramic powder suspended in the thinner was then added to the alumina flame spray powder in the phenolic varnish and the two thoroughly mixed together in an electric mixer while heating to a temperature of 150° F. to cause drying. After drying, the powder was passed through a 200 mesh screen (U.S. Standard screen size), only 1.6 percent by weight of the powder having agglomerated and thus being retained on the screen. The screened powder consisted of individual particles of the aluminum oxide-titanium oxide powder having approximately 10 percent by volume of the particles of lithium cobaltite bonded to its surface by the phenolic resin. The powder was then flame sprayed, utilizing a plasma type powder flame spray gum (METCO Type 2MB), as sold by Metco, Inc. of Westbury, Long Island. Spraying was effected, using a current of 450 amps, a gas mixture of nitrogen and hydrogen having flow rates of 100 SCFH nitrogen and 15 SCFH hydrogen. The spraying was effected onto a steel shaft 1/2 inch diameter prepared by grit blasting with aluminum oxide grit +12 −35 mesh, using compressed air at 100 p.s.i., at a distance of between 6 and 7 inches, spraying at a rate of 4 lbs. of powder per hour. A coating of 0.015 inch thickness was formed, which was then ground with a silicon carbide grinding wheel to a finish of 16–20 microinches and lapped to a 9–13 microinch finish, with 9 micron diamond paste. The finished coating was 0.010 inch thick, was highly impervious, and abrasion, corrosion and oxidation resistant. When immersed in a 2 percent salt solution the sprayed surface resisted corrosion for over 18 months without any signs of coating failure. The coating was not quite as hard as a flame spray coating formed from the alumina flame spray powder per se, but may be oversprayed with this powder to obtain this hardness and wear-resistance.

EXAMPLE 2

Example 1 was repeated, using the following powder combinations: (Percentages by volume.)
1. alumina coated with 20 percent manganite
2. alumina coated with 10 percent borosilicate glass
3. zirconia coated with 10 percent lithium cobaltite
4. zirconia coated with 10 percent lithium zirconate
5. silica coated with 10 percent lithium silicate
6. nickel-chrome coated with 5 percent borosilicate glass
7. alumina coated with 10 percent high silica glass
8. alumina coated with 10 percent alumina borosilicate The same particle sizes as set forth in Example 1 were used except in connection with (5), (6), and (7), in which case the initial core powder had a size between −200 and +325 mesh.

EXAMPLE 3

Example 2 was repeated except that the powders were sprayed, using a conventional combustion-type powder flame spray gun (METCO ThermoSpray Gun, Type 2P) with an oxygen flow of 47 SCFH, acetylene flow of 38 SCFH, a spray distance of between 2 and 3 inches, and a spray rate of 2 lbs. per hour.

EXAMPLE 4

MgO powder having a particle size between −270 mesh and +15 microns (U.S. Standard screen size) is coated with a high purity pigment grade titanium dioxide ($TiO_2$) powder of a particle size below 15 microns in the manner described in Example 1 so that the $TiO_2$ amounts to between 0.7 and 4.0 volume percent based on the total of MgO and $TiO_2$.

A portion of the powder formed is flame sprayed on a mild steel plate, which has been previously roughened by grit blasting, utilizing a powder-type flame spray gun (METCO ThermoSpray Gun). The spraying is effected at a distance of about 3 inches using acetylene gas as the fuel at 12 p.s.i., and a flow rate of 45 to 55 SCFH. The coating produced shows the characteristics of a MgO coating.

A further portion of the powder formed is sprayed on a grit blasted mild steel plate using a plasma flame spray gun (METCO type 2 MB). The spraying is effected using nitrogen as the plasma gas at an arc current of 550 amperes at 50–55 volts. The plasma gas is fed at a pressure of 50 p.s.i. at a flow rate of 100 SCFH. The powder is fed in nitrogen as a carrier gas at a pressure of 50 p.s.i., and a flow rate of 11 SCFA. The particles are deposited to form a hard, dense, abrasion- and heat-resistant coating of approximately 0.002 inch thick, which has a low porosity as indicated by slow penetration of a potassium ferricyanide porosity indicating solution.

MgO coatings are desirable for many aerospace applications due to their refractory properties, high melting point, and the erosion and oxidation resistance of the material, and due to its transparency to infrared radiation. In the past however, MgO powder has not proven suitable as a flame spray powder as only thin, soft, powdery coatings could be obtained by the use of the same probably because the boiling point of the magnesium oxide is very close to its melting point. The titanium oxide coating MgO powder, however, avoids this difficulty and allows the spraying of high grade MgO coatings. Coatings of 0.004 inch thicker have essentially no through-porosity as may be ascertained by lack of reaction of a potassium ferricyanide indicating solution with the substrate material. The MgO base powder may have a particle size range between −140 mesh and +5 microns (U.S. Standard screen size) and preferably between −270 mesh and +15 microns. The titanium dioxide coating may constitute 0.4 to 10 volume percent, preferably 0.7 to 4.0 volume percent, and most preferably 4 weight percent based on the total of magnesium oxide and titanium dioxide. The spraying as indicated may be effected with conventional powder spray equipment, or a plasma flame spray gun. When using the latter, though nitrogen and hydrogen may be used as the plasma gas, plasma alone without hydrogen has proven preferable.

EXAMPLE 5

Example 1 was repeated except that high purity pigment grade titanium dioxide of a particle size below 5 microns was used as the fluxing ceramic. The resulting powder of alumina clad with 7.75 percent by volume titania was plasma flame sprayed onto steel in the manner of Example 1.

This ceramic coating was a black, glazed-appearing coating having extremely high hardness, and very low porosity. A coating 0.010 inch thick applied to steel was exposed to 2 percent NaCl dissolved in water, with no significant attack through the coating in over 40 days.

Thus, this coating is very useful in applications requiring wear and abrasion resistance, especially in corrosive environments where protection of the substrate is also required. The coating also showed high resistance to voltage breakdown and thus has application as an electrical insulator.

EXAMPLE 6

A composite powder comprising 10.1 percent by volume titanium oxide, balance aluminum oxide based on the total of these oxides, was fabricated as follows:

Calcined aluminum oxide of mesh size 1 to 10 microns was thoroughly blended with a high purity pigment grade titanium dioxide powder of a particle size below 5 microns. This powder mixture was mixed with water which had dissolved in it 2 percent by weight of polyvinyl alcohol. The slurry was poured on a flat pan and thoroughly dried in an oven at about 150° F., then crushed and screened to a particle size between −270 mesh and +15 microns.

This powder was plasma flame sprayed in the same manner as in Examples 1 and 5. Coatings were gray in appearance but otherwise had similar properties to those produced by the titania clad alumina, Example 5. except for the dielectric strength, which was somewhat less.

While the invention has been described in detail with reference to certain specific embodiments, various changes and modifications which fall within the spirit of the invention and scope of the appended claims will become apparent to the skilled artisan. The invention is thus only intended to be limited by the appended claims or their equivalents wherein we have endeavored to claim all inherent novelty.

1. In the flame spray process in which the alumina powder is heated to at least heat-softened condition and sprayed onto a substrate to be coated, the improvement which comprises heating and spraying alumina flame spray powder particles having 1 to 50 percent by volume of titanium dioxide bonded to the surface thereof in which said alumina particles have a particle size between about +5 microns and −100 mesh and in which said titanium dioxide is in the form of particles having a particle size of −10 microns bonded to the alumina particles with a bonding agent which is substantially decomposed or volatilized during the flame spray process.

2. Improvement according to claim 1 in which said alumina particles contain 5 to 25 percent of said titanium dioxide bonded to the surface thereof.

3. Improvement according to claim 1 in which said bonding agent is an organic bonding agent.

4. Improvement according to claim 3 in which said organic bonding agent is a phenolic resin bonding agent.

5. A flame spray powder consisting essentially of particles of aluminum oxide having a particle size between about +5 microns and −100 mesh and having 1 to 50 percent by volume of titanium dioxide in the form of particles having a particle size of −10 microns bonded to the surface of the alumina particles with a bonding agent which is substantially decomposable or volatilizable during a flame spray process.

6. Flame spray powder as claimed in claim 5 in which said aluminum oxide particles contain from 5 to 25 percent by volume of said titanium oxide bonded to the surface thereof.

7. Flame spray powder as claimed in claim 5 wherein said bonding agent is an organic bonding agent.

8. Flame spray powder as claimed in claim 6 in which the organic bonding agent is a phenolic resin bonding agent.

PO-1050
(5/69)

UNITED STATES PATENT OFFICE
CERTIFICATE OF CORRECTION

Patent No. 3,607,343          Dated Sept. 21, 1971

Inventor(s) FRANK N. LONGO and FERDINAND J. DITTRICH

It is certified that error appears in the above-identified patent and that said Letters Patent are hereby corrected as shown below:

Column 3, line 62, "ear" should be --wear--; column 5, line 10, before "manganite" insert --lithium--

Signed and sealed this 4th day of July 1972.

(SEAL)
Attest:

EDWARD M. FLETCHER, JR.
Attesting Officer

ROBERT GOTTSCHALK
Commissioner of Patents